United States Patent
Lebzelter et al.

(10) Patent No.: US 9,099,702 B2
(45) Date of Patent: Aug. 4, 2015

(54) METHOD FOR RUNNING A FUEL CELL SYSTEM WITH A FAILED STACK HEALTH MONITOR

(71) Applicant: GM GLOBAL TECHNOLOGY OPERATIONS LLC, Detroit, MI (US)

(72) Inventors: Derek R. Lebzelter, Fairport, NY (US); Steven R. Falta, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 13/708,563

(22) Filed: Dec. 7, 2012

(65) Prior Publication Data

US 2014/0162159 A1 Jun. 12, 2014

(51) Int. Cl.
*H01M 8/04* (2006.01)

(52) U.S. Cl.
CPC ...... *H01M 8/04679* (2013.01); *H01M 8/04559* (2013.01); *H01M 8/04694* (2013.01); *Y02E 60/50* (2013.01)

(58) Field of Classification Search
CPC .................................. H01M 8/04; H01M 8/10
USPC ......................................................... 429/432
See application file for complete search history.

(56) References Cited

U.S. PATENT DOCUMENTS

| | | | |
|---|---|---|---|
| 6,280,867 B1 * | 8/2001 | Elias | 429/423 |
| 6,428,917 B1 * | 8/2002 | Lacy et al. | 429/432 |
| 6,697,745 B2 * | 2/2004 | Jones et al. | 702/60 |
| 7,320,840 B2 | 1/2008 | Pechtold et al. | |
| 2002/0053896 A1 * | 5/2002 | Adams et al. | 320/121 |
| 2003/0022031 A1 * | 1/2003 | Manery | 429/7 |
| 2003/0022042 A1 * | 1/2003 | Wells et al. | 429/23 |
| 2006/0172162 A1 * | 8/2006 | Pearson | 429/22 |
| 2008/0081224 A1 * | 4/2008 | Burch et al. | 429/13 |
| 2009/0117417 A1 * | 5/2009 | Lienkamp et al. | 429/13 |
| 2009/0197155 A1 * | 8/2009 | Ganapathy et al. | 429/90 |
| 2010/0190075 A1 * | 7/2010 | Frost et al. | 429/433 |
| 2011/0076581 A1 | 3/2011 | Lai | |
| 2011/0087389 A1 | 4/2011 | Burleigh | |
| 2011/0091781 A1 * | 4/2011 | Folmsbee et al. | 429/413 |
| 2011/0200913 A1 | 8/2011 | Rea | |
| 2011/0274996 A1 | 11/2011 | Frost | |
| 2012/0156575 A1 | 6/2012 | Di Fiore | |

* cited by examiner

*Primary Examiner* — Stewart Fraser
*Assistant Examiner* — Olatunji Godo
(74) *Attorney, Agent, or Firm* — John A. Miller; Miller IP Group, PLC

(57) ABSTRACT

A system and method for selectively operating a fuel cell stack in response to loss of a voltage signal from one or more fuel cells in the stack. If the voltage signal from the one or more fuel cells is lost, the method performs one or more remedial actions to cause the fuel cell stack to operate in a more stack safe condition. The method then determines whether the cell or cells whose voltage signal is lost was healthy, such as operating above a predetermined voltage threshold, prior to the voltage signal being lost. If the cell voltage signal was above the voltage threshold, then the fuel cell stack is operated normally under the remedial actions, and if the voltage signal is below the voltage threshold, then the fuel cell stack is operated in a power limitation mode.

18 Claims, 1 Drawing Sheet

METHOD FOR RUNNING A FUEL CELL SYSTEM WITH A FAILED STACK HEALTH MONITOR

BACKGROUND OF THE INVENTION

1. Field of the Invention

This invention relates generally to a system and method for operating a fuel cell stack in response to loss of a cell voltage signal and, more particularly, to a system and method for operating a fuel cell stack in response to loss of a cell voltage signal that includes determining whether the cell was operating properly prior to the signal being lost.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack by serial coupling to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As a fuel cell stack ages, the performance of the individual cells in the stack degrade differently as a result of various factors. In addition, there are various stack operating conditions that cause the cells to operate differently. There are various causes of low performing cells, such as cell flooding, loss of catalyst, etc., some temporary and some permanent, some requiring maintenance, and some requiring stack replacement to exchange the low performing cells. Although the fuel cells are electrically coupled in series, the voltage of each cell when a load is coupled across the stack decreases differently where those cells that are low performing have lower voltages. Because all of the fuel cells are electrically coupled in series, if one fuel cell in the stack fails, then the entire stack will fail. Further, since the cells are electrically coupled in series, each cell must produce the full stack current. If one cell is starved of reactants, especially hydrogen, the voltage for that cell will drop and undesirable side reactions could occur. Thus, it is necessary to separately monitor the voltages of the fuel cells in a stack to ensure that the voltages of the cells do not drop below a predetermined threshold voltage to prevent cell voltage polarity reversal, possibly causing permanent damage to the cell.

Cell voltage monitors or stack health monitors are used to measure the voltage of the fuel cells in the stack to look for behavior in the cells indicative of problems with the stack. The cell voltage monitor generally includes an electrical connection to each bipolar plate, or some number of bipolar plates, in the stack and end plates of the stack to measure a voltage potential between the positive and negative sides of each cell. Therefore, a 400 cell stack may include 401 wires connected to the stack. If the cell voltage monitor fails, it is not possible to see a voltage drop and the system becomes unable to react by limiting power or changing system operating conditions. Continued operation with unhealthy cells can degrade the catalyst, especially on the anode, and potentially lead to cell shorting and internal hydrogen leaks.

The various connections to the fuel cell plates or other structures on the fuel cell stack may fail or otherwise be damaged where a signal for a particular cell or group of cells may be lost. In the event that the voltage signal from a cell or group of cells in the stack is lost, the fuel cell system needs to make some adjustments in system operation, possibly running the stack at a lower performance and efficiency than is desirable so that in the event that the cell or group of cells that is not being monitored does begin to lose voltage, the likelihood that serious damage to the stack could occur is reduced. Depending on the circumstances of the stack operating conditions, the system may be designed to provide severe power limitations in the event of loss of voltage signal from the cell to prevent stack damage.

SUMMARY OF THE INVENTION

In accordance with the teachings of the present invention, a system and method are disclosed for selectively operating a fuel cell stack in response to loss of a voltage signal from one or more fuel cells in the stack. If the voltage signal from the one or more fuel cells is lost, the method performs one or more remedial actions to cause the fuel cell stack to operate in a condition more favorable to stack durability. The method then determines whether the cell or cells whose voltage signal is lost was healthy, such as operating above a predetermined voltage threshold, prior to the voltage signal being lost. If the cell voltage signal was above the voltage threshold, then the fuel cell stack is operated normally under the remedial actions, and if the voltage signal is below the voltage threshold, then the fuel cell stack is operated in a power limitation mode.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for operating a fuel cell stack in response to loss of a cell voltage monitoring signal is merely exemplary in nature, and is in no way intended to limit the invention or its applications or uses.

Figure 1:
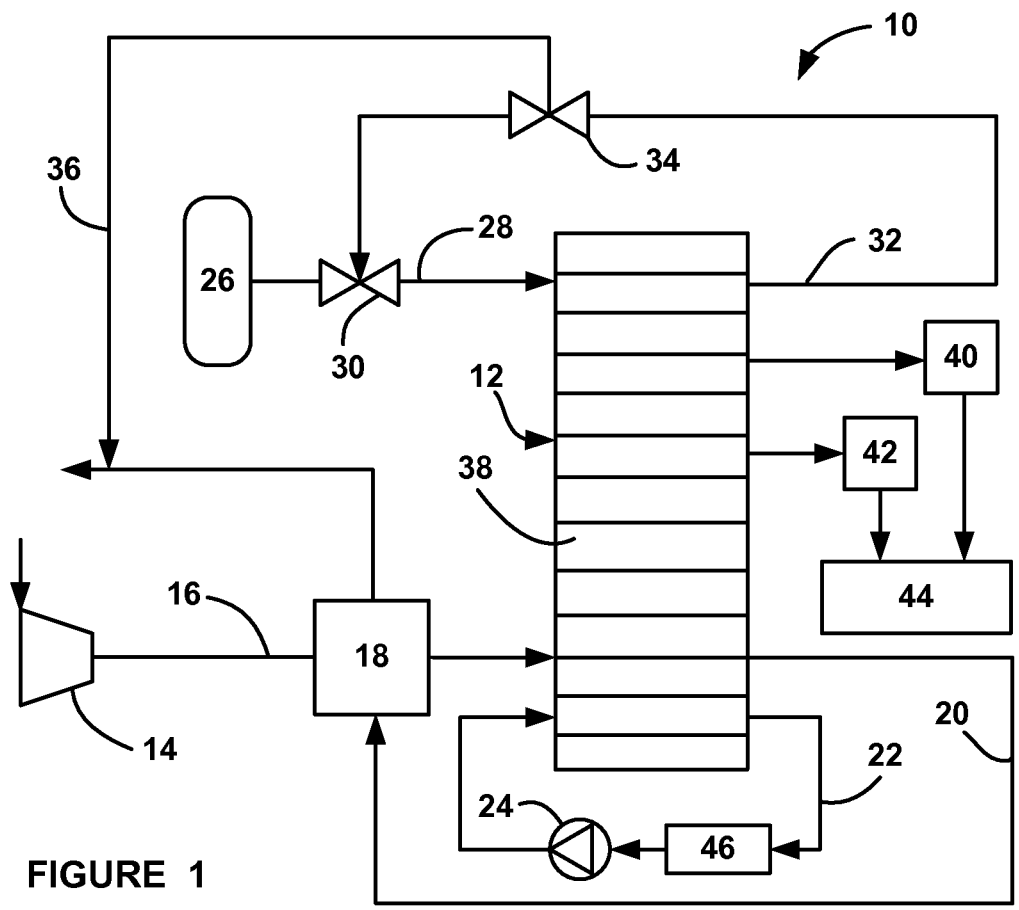
FIG. 1 is a simple illustration of a fuel cell system.

FIG. 1 is a simple schematic block diagram of a fuel cell system 10 including a fuel cell stack 12 having a series of fuel cells 38. A compressor 14 provides airflow to the cathode side of the fuel cell stack 12 on a cathode input line 16 through, for example, a water vapor transfer (WVT) unit 18 that humidifies the cathode input air. A cathode exhaust gas is output from the stack 12 on a cathode exhaust gas line 20, which directs the cathode exhaust to the WVT unit 18 to provide the water content to humidify the cathode input air in a manner that is well understood by those skilled in the art.

The fuel cell stack 12 also receives hydrogen from a hydrogen source 26 that provides hydrogen gas to the anode side of the fuel cell stack 12 on an anode input line 28 by, for example, an injector 30. An anode exhaust gas is output from the fuel cell stack 12 on a recirculation line 32 that recirculates the anode exhaust back to the anode input by providing it to the injector 30 that may operate as an injector/ejector, well known to those skilled in the art. One suitable example of an injector/ejector is described in U.S. Pat. No. 7,320,840, entitled "Combination of Injector-Ejector for Fuel Cell Systems," assigned to the assignee of this application and incorporated herein by reference. In an alternate embodiment, the recirculation function of the line 32 could be performed by a pump or compressor instead of an injector/ejector. As is well understood in the art, nitrogen accumulates in the anode side of the stack 12 that reduces the concentration of hydrogen therein, and affects the performance of the system 10. A bleed valve 34 is provided in the recirculation line 32 to periodically bleed the exhaust gas and liquid to remove nitrogen from the anode sub-system. The bled anode exhaust gas is provided on a bleed line 36 to the cathode exhaust line 20.

The system 10 also includes a thermal sub-system having a pump 24 that pumps a cooling fluid through fluid flow channels within the stack 12 and a coolant loop 22 external to the stack 12. The cooling fluid is sent to a radiator 24 to reduce the temperature of the cooling fluid before it is sent back to the fuel cell stack 12.

The system 10 also includes a cell voltage monitor 40 that monitors the voltage of each of the cells 38 within the stack 12. The cell voltage monitor 40 is intended to be a general representation of any suitable cell voltage monitoring circuit or system that provides the various electrical connections, optical connections, etc. to suitable structures or elements within the fuel cell stack 12, such as a physical wire electrically coupled to each bipolar plate separating the fuel cells 38 in the fuel cell stack 12.

One technique for determining membrane humidification is known in the art as high frequency resistance (HFR) humidification measuring. The fuel cell system 10 includes an HFR circuit 42 to provide HFR measuring intended to represent any suitable HFR measuring circuit know in the art. HFR humidification measurements are generated by providing a high frequency component or signal on the electrical load of the stack 12 so that a high frequency ripple is produced on the current output of the stack 12, where the high frequency signal is typically 500 Hz to 10 kHz. The resistance of the high frequency component is then measured by the circuit 42, which is a function of the level of humidification of the membranes in the stack 12. High frequency resistance is a well-known property of fuel cells, and is closely related to the ohmic resistance, or membrane protonic resistance, of the fuel cell membrane. Ohmic resistance is itself a function of the degree of fuel cell membrane humidification. Therefore, by measuring the HFR of the fuel cell membranes of the fuel cell stack 12 within a specific band of excitation current frequencies, the degree of humidification of the fuel cell membrane may be determined.

A controller 44 controls the operation of the system 10, including the pump 24, the compressor 14, the valves 30 and 34, etc., and receives the HFR signal from the HFR circuit 42 and the voltage signals from the cell voltage monitor 40.

The present invention proposes a technique for addressing the situation where the cell voltage monitor circuit 40 loses the voltage signal from a cell or group of the cells 38. The controller 44 determines how well the cells 38 were behaving prior to the loss of the signal, and if the cells 38 were healthy and behaving properly, the controller 44 continues to allow normal stack power management, but with one or more remedial operations that cause the stack 12 to operate more safely. If one or more of the cells 38 were unhealthy prior to the loss of the voltage signal, the controller 44 would limit the power of the stack 12 to ensure that no lasting damage is inflicted on the stack 12. The distinction between a healthy and unhealthy cell can be determined in any suitable manner, such as by looking at the absolute value of the minimum cell voltage, the difference between the minimum cell voltage and the average cell voltage, the difference between the minimum cell voltage and the maximum cell voltage, the standard deviation of the cell voltages or any similar measurement of the cell voltage.

When the stack 12 is stable prior to losing the voltage signal, there is no reason to expect that the stack 12 would suddenly become unstable. If the cells 38 truly do not have a high enough voltage, there would be some sign of low voltage on at least one of the cells 38 before the loss of signal occurred. Thus, a less severe action is taken when the stack 12 is healthy and stable just before signal loss than if there was a poor performance because the loss of signal can be attributed to the cell voltage monitor 40 device rather than the cells 38.

Whether the stack 12 is healthy or unhealthy, the controller 44 would operate the stack 12 under the remedial actions. Those remedial actions would likely be based on the particular system and/or the particular system operating conditions. Examples of remedial actions include increasing the target anode hydrogen mole fraction to reduce the risk of fuel starvation and changing the stack humidification set-points to run in a safe region, i.e., not too dry or not too wet. Operations such as pulsing the coolant flow using the pump 24 that may be employed to conserve system resources could be stopped since there would not be a way to see the effect of pulsing the coolant flow on the cell voltage.

It may be desirable to put the system in a stand-by mode where the system 10 is consuming little or no power, the quantity of hydrogen fuel being used is minimal and the system 10 can quickly recover from the stand-by mode so as to increase system efficiency and reduce system degradation. U.S. patent application Ser. No. 12/723,261, titled, Standby Mode for Optimization of Efficiency and Durability of a Fuel Cell Vehicle Application, filed Mar. 12, 2010, assigned to the assignee of this application and herein incorporated by reference, discloses one process for putting a fuel cell system on a vehicle in a stand-by mode to conserve fuel. As part of the remedial actions, stand-by modes could be disabled until the cell voltage monitor 40 was operating properly since the stand-by mode does involve starving the cathode of air since there would be no way to know whether the system came out of the stand-by mode correctly.

Further, the controller 44 could prevent cell voltage recovery that involves running the stack very wet and intentionally starving the stack 12 of oxygen. U.S. patent application Ser. No. 12/580,912, filed Oct. 16, 2009, titled, Automated Procedure For Executing In-Situ Fuel Cell Stack Reconditioning, assigned to the assignee of this application and herein incorporated by reference, discloses a system and method for reconditioning a fuel cell stack that includes increasing the humidification level of the cathode side of the stack to hydrate the cell membranes and providing hydrogen to the anode side of the fuel cell stack at system shut-down, where the system monitors reconditioning event triggers, reconditioning thresholds and reconditioning system checks so that the reconditioning process can be provided during vehicle operation.

When all of the cells 38 are reporting proper voltage signals, the fault would be passed and the stack 12 would continue to run as normal.

For a healthy stack, the cell voltage monitor diagnostic will look for the minimum cell voltage at the time period prior to loss of the cell voltage signal. If that voltage is higher than 450 mV, or some other threshold that is more appropriate to the particular system, the system 10 may take about 20 seconds to fault the cell voltage monitor 40. If a shut-down is requested during that 20 seconds of fault maturation, the diagnostic may consider the voltage monitor faulty earlier to avoid faulting the sensor in the next start. Faulting the monitor 40 during a start-up operation could cause severe power limitations as will be shown. When the fault is active, the actions must be taken to keep the stack 12 operating as robustly as possible. The healthy stack voltage monitor loss diagnostic will be latched over starts. After the stack 12 makes it through a start-up with this diagnostic, it can run without power limitation, subject to the conditions described herein until the cell monitoring diagnostic has passed.

Even though the cells 38 were operating normally prior to the loss of cell voltage monitoring signal, the system 10 will be running blindly for those cells 38 when the signal is lost. Problems could arise at any time without the cell voltage monitor 40 knowing and without taking the appropriate actions. The longer the system 10 is operating with the loss of signal, the higher the probability that stack damage can occur.

Figure 2:
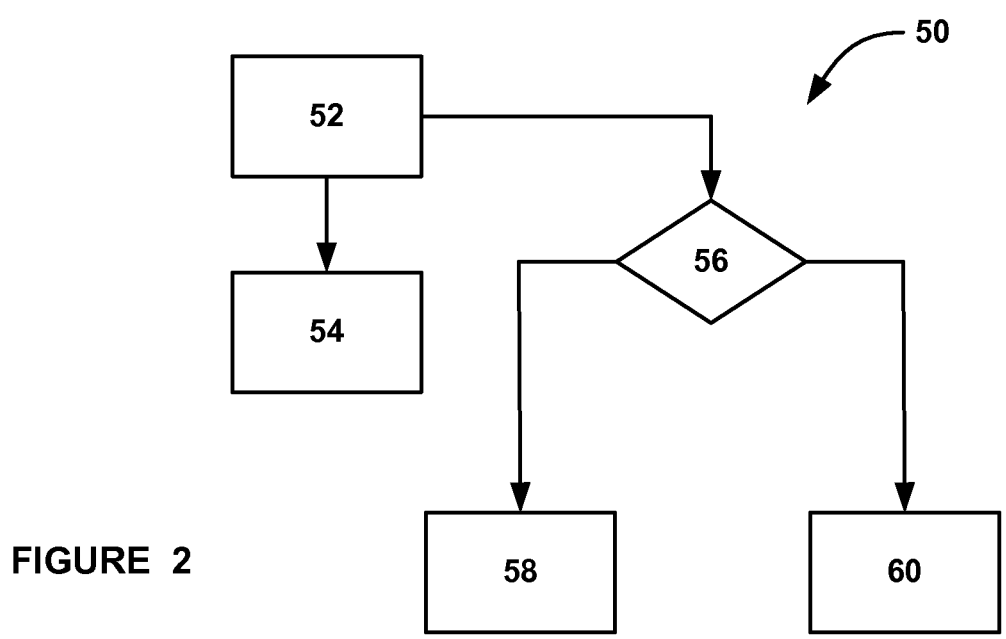
FIG. 2 is a flow chart diagram showing a process for responding to a loss of cell voltage monitoring signal.

FIG. 2 is a flow chart diagram 50 showing a process for operating the fuel cell system 10 in the event that one or more voltage signals provided by the fuel cells 38 to the cell voltage monitor 40 fails in the manner discussed above. The controller 44 monitors the voltage signals from the cell voltage monitor 40 and may determine that one or more of those signals have been lost at box 52 for one of the several reasons discussed herein. In the event that this occurs, the controller 44 takes two actions. The first action, represented by box 54, is actually a plurality of remedial actions in response to not knowing whether the cells 38 that are no longer being monitored by the cell monitor 40 are operating properly. As discussed above, those remedial actions can include one or more of changing the cathode stoichiometry of the stack 12 so that a low voltage cell would be less likely to get worse, operating the stack 12 at a safe humidity level that may be a little higher or lower than what would normally be desired for a particular stack operating condition so that a low voltage cell would be less likely to go lower, limiting power transients so that requests for high power would occur less quickly, preventing stand-by mode operation, preventing coolant pulsing, etc.

Further, HFR-based current limitations may be reduced to be more conservative and reduce power more quickly if the stack 12 begins drying out. See, for example, United States Patent Application Publication No. 2011/0076581, assigned to the assignee of this application and herein incorporated by reference. For example, normally power may be limited to 0.8 $A/cm^2$ at 150 $m\Omega\text{-}cm^2$. However, with loss of a cell voltage signal, that power may be reduced to an allowable current of 0.4 $A/cm^2$. Further, a different current ramp rate limit may be employed that is HFR based. Also, the anode hydrogen dry mole fraction set-point could be increased to make anode starvation less likely. A system restart could be permitted, but the start-up could be longer, such as a few seconds, than normal to maximize the probability that all of the cells 38 have reactants and are functioning properly. This would apply for coming out of a stand-by mode also, if permitted. Further, the operating conditions could be switched to a slightly drier operating regime to avoid anode flooding. Particularly, instead of running at 100% of RH out of the stack 12, the operating conditions could be made closer to, for example, 85% RH from the stack 12. The HFR current limit threshold could be used to prevent the stack 12 from becoming too dry. If the voltage signal is lost and an anode mass balance diagnostic shows that the system is losing more mass than expected, a shut down could be implemented to ensure that no potential thermal events persisted because the state of the cell 38 is not known and the worst must be assumed. See, for example, United States Patent Application Publication Nos. 2012/0156575 and 2011/0274996, assigned to the assignee of this application and herein incorporated by reference. The maturation time for the shut down may be longer than the maturation times of the individual anode mass balance and cell voltage monitor diagnostics. The stack 12 could be allowed to warm up longer before allowing user or driver controlled operation. This would prevent driving the stack 12 too hard when there are potential ice issues on the anode. The amount of load drawn by the stack 12 may be reduced during a subzero start. This can cause more reactants to slip to the exhaust and longer warm-up times, but would reduce the chances of anode starvation.

The discussion above for the remedial actions is intended to reduce the chance that a cell or group of the cells 38 that were operating normally when the cell voltage signal was lost becomes unhealthy by having too low of a voltage as a result of system operations while the voltage signal is unavailable. Each of these operations, whether used in combination or individually, should have limited effect on whether the driver of the vehicle notices the change. However, these metrics do not allow the system 10 to operate at its maximum efficiency, including, possibly a slower transient time, system efficiency of fuel use, slightly longer start times, longer wait times for cold starts, increased voltage degradation of the catalyst due to dry operation and lack of recovery, and a time for coming out of the stand-by mode may be longer if stand-by is even allowed.

While the controller 44 implements one or more of the remedial actions discussed above at the box 54, the controller 44 also determines whether the cell or group of cells 38 were operating normally when the voltage signal was lost at decision diamond 56. As is well understood by those skilled in the art, the voltage signals from the cells 38 in the stack 12 are continually monitored and if the voltage of a cell 38 starts dropping and looking as if there may be a problem with that cell 38, the controller 44 takes some action to prevent that cell voltage from further dropping, including limiting the power operation of the stack 12 in the event of a severely low cell voltage. If the cell or group of cells 38 were operating normally at the decision diamond 56 prior to loss of voltage signal, then the controller 44 operates the system 10 normally at box 58, but with the remedial operations occurring as discussed above. If it is determined that the cells or group of cells 38 was not operating properly, i.e., at a low voltage at the decision diamond 56, then the controller 44 causes the system 10 to operate in a power limited mode at box 60.

Losing the entire cell voltage monitor 40 when a minimum cell voltage is low is unlikely since these two events are unrelated. However, losing just one of the signals of a cell 38 while experiencing a low minimum cell voltage is more likely since these two events could be related when the cell voltage monitor is powered by the group of cells it is monitoring. See, for example, United States Patent Application Publication No. 2011/0200913, assigned to the assignee of this application and herein incorporated by reference. If the average of sixteen cells drops below a certain threshold, such as 100 mV/cell, the cell voltage monitor 40 will be not functioning and will look for a component malfunction. There are certain instances of the cell voltage going that low that should not normally be a problem including during the first stages of start-up, the last stages of shut-down, the low voltage operation part of voltage recovery, and most of the stand-by and during off-time. In these cases, the cell voltage monitor 40 is not faulted. When a low voltage happens unexpectedly and the minimum cell voltage is low, such as less than 450 mV, the unhealthy stack loss diagnostic is triggered.

At the box 60, the stack power would be drastically limited, where that power limitation may be less than 10% of rated power. The HFR-based current limitation could be reduced in the same manner as discussed above though the global power limitation is probably the overriding power limitation. The anode hydrogen dry mode fraction set-point would be increased to make anode starvation less likely. The operating conditions of the stack 12 would be moved to a dryer set-point also in the same manner as discussed above. Restart of the system 10 would be allowed, but would not proceed into run mode unless the cell voltage monitor 40 could pass its diagnostic. The anode mass balance diagnostic fault combined with an unhealthy stack diagnosis could trigger a quick-stop because of fear of shorts or hydrogen leaks. If the stack 12 suffers from an unhealthy stack during system warm-up from sub zero temperatures the vehicle will not be permitted to drive away until the diagnostic has been passed. Allowable up-transient rates would be reduced to account for the uncertainty of the minimum cells performance. This rate could be different than in a healthy stack case.

An interesting case that does not fit neatly into either of the above categories is a system start-up where everything was operating normally in the previous run, but one or more of the cells 38 does not function when the system 10 is started again. This cannot be definitively attributed to the cell voltage monitor 40 failing to report due to component failure because the system 10 was unable to monitor the state of stack health when the cells 38 stopped reporting. Thus it cannot be determined whether the cells 38 are healthy or unhealthy in the unmonitored portion of the stack 12. Ice buildup within the stack 12 could be one way in which the cell voltage monitor 40 could fail to report without it being an electronics problem. In these cases, it may be necessary to take the same tactic as the unhealthy stack failure. In this event, the system 10 will be allowed to start, but operate a little longer to determine if the cell voltage monitor 40 ever fully functioned. If it did not, then the system 10 would not be allowed to continue operating. Restarts could be allowed to see if either the electronics started functioning again or if some ice blockage in the stack causing low voltages melted.

In the event that a cell or group of the cells 38 was determined to be bad prior to the signal loss, and the controller 44 only allows the system 10 to run in the low power limitation, once the vehicle is keyed off, the controller 44 would not let the vehicle enter run mode on the next start-up unless the lost signals were again received and indicated that the cells 38 were operating normally. If the cells 38 were operating properly when the signal was lost, then the controller 44 assumes that they still are operating properly at the next vehicle start-up, and allows the vehicle to enter the run mode, but with the remedial actions being implemented as discussed above.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for operating a fuel cell system including a fuel cell stack, said fuel cell stack including a plurality of fuel cells electrically coupled in series, said method comprising:
monitoring a voltage of the fuel cells in the fuel cell stack using a cell voltage monitor;
determining that a voltage signal from one or more of the fuel cells in the fuel cell stack is lost and not being received by the cell voltage monitor;
performing one or more remedial actions in response to the loss of the voltage signal where the remedial actions cause the fuel cell stack to operate in a condition more favorable for stack durability, wherein performing one or more remedial actions includes preventing stack coolant pulsing;
determining whether the cell or cells whose voltage signal is lost were healthy prior to the voltage signal being lost;
operating the fuel cell stack under the remedial actions if the cell or cells were healthy; and
operating the fuel cell stack in a power limitation mode where a power output of the stack is limited if the voltage of the cell or cells were not healthy.

2. The method according to claim 1 wherein performing one or more remedial actions includes operating an anode hydrogen input to the fuel cell stack at an increased hydrogen dry mole fraction set-point.

3. The method according to claim 1 wherein performing one or more remedial actions includes increasing the time for start-up of the fuel cell system.

4. The method according to claim 1 wherein performing one or more remedial actions includes operating the fuel cell stack at a relative humidity that helps cells remain stable.

5. The method according to claim 1 wherein performing one or more remedial actions includes increasing a stack warm-up time before allowing system operation after system start-up.

6. The method according to claim 1 wherein performing one or more remedial actions includes preventing a stack voltage recovery operation.

7. The method according to claim 1 wherein performing one or more remedial actions includes preventing the fuel cell stack from going into a stand-by mode.

8. The method according to claim 1 wherein performing one or more remedial actions includes limiting stack power up transients.

9. The method according to claim 1 further comprising preventing the system from entering run mode if it is determined that the voltage signal from one or more of the fuel cells in the fuel cell stack is lost and not being received by the cell voltage monitor during a start-up routine of the system unless the voltage signal was lost during a previous run when cells were healthy.

10. The method according to claim 1 wherein determining whether the cell or cells whose voltage signal is lost were healthy includes using one or more of an absolute value of a minimum cell voltage, a difference between the minimum cell voltage and an average cell voltage, a difference between the minimum cell voltage and a maximum cell voltage, and a standard deviation of the cell voltages.

11. The method according to claim 1 wherein determining whether the cell or cells whose voltage signal is lost were healthy includes determining whether a voltage of the cell or cells whose voltage signal is lost was operating above a predetermined voltage threshold prior to the voltage signal being lost.

12. The method according to claim 11 wherein the voltage threshold is about 450 mV.

13. A method for operating a fuel cell system including a fuel cell stack, said fuel cell stack including a plurality of fuel cells electrically coupled in series, said method comprising:
monitoring a voltage of the fuel cells in the fuel cell stack using a cell voltage monitor;
determining that a voltage signal from one or more of the fuel cells in the fuel cell stack is lost and not being received by the cell voltage monitor;
performing one or more remedial actions in response to loss of the voltage signal where the remedial actions cause the fuel cell stack to operate in a condition more favorable for stack durability;
determining whether a voltage of the cell or cells whose voltage signal is lost was operating above a predetermined voltage threshold prior to the voltage signal being lost;
operating the fuel cell stack under the remedial actions if the cell or cells was above the voltage threshold; and
operating the fuel cell stack in a power limitation mode where a power output of the stack is limited if the voltage of the cell or cells was below the voltage threshold; and
preventing the system from entering run mode if it is determined that the voltage signal from one or more of the fuel cells in the fuel cell stack is lost and not being received by the cell voltage monitor during a start-up routine of the system unless the voltage signal was lost during a previous run when cells were healthy.

14. The method according to claim 13 wherein performing one or more remedial actions includes performing one or more remedial actions selected from the group consisting of operating an anode hydrogen input to the fuel cell stack at an increased hydrogen dry mole fraction set-point, increasing start-up time of the fuel cell system, operating the fuel cell stack at a relative humidity that helps cells remain stable, increasing a stack warm-up time before allowing system operation after system start-up, preventing stack coolant pulsing, preventing a stack voltage recovery, preventing the fuel cell stack from going into a stand-by mode and limiting stack power-up transients.

15. The method according to claim 13 wherein the voltage threshold is about 450 mV.

16. A control system for operating a fuel cell system including a fuel cell stack, said fuel cell stack including a plurality of fuel cells electrically coupled in series, said system comprising:
a cell voltage monitor for monitoring a voltage of fuel cells in the fuel cell stack using a cell voltage monitor;
a controller programmed to provide:
means for determining that a voltage signal from one or more of the fuel cells in the fuel cell stack is lost and not being received by the cell voltage monitor;
means for performing one or more remedial actions in response to loss of the voltage signal where the remedial actions cause the fuel cell stack to operate in a more stack safe condition;
means for determining whether a voltage of the cell or cells whose voltage signal is lost was operating above a predetermined voltage threshold prior to the voltage signal being lost;
means for operating the fuel cell stack under the remedial actions if the voltage of the cell or cells was above the voltage threshold; and
means for operating the fuel cell stack in a power limitation mode where a power output of the stack is limited if the cell or cells was below the voltage threshold.

17. The control system according to claim 16 wherein the means for performing one or more remedial actions performs one or more remedial actions selected from the group consisting of operating an anode hydrogen input to the fuel cell stack at an increased hydrogen dry mole fraction set-point, increasing start-up time of the fuel cell system, operating the fuel cell stack at a relative humidity that helps cells remain stable, increasing a stack warm-up time before allowing system operation at system start-up, preventing stack coolant pulsing, preventing a stack voltage recovery, preventing the fuel cell stack from going into a stand-by mode and limiting stack power-up transients.

18. The control system according to claim 16 further comprising means for preventing the fuel cell system from entering a run mode if it is determined that the voltage signal from one or more of the fuel cells in the fuel cell stack is lost and not being received by the cell voltage monitor during a start-up routine of the system unless the voltage signal was lost during a previous run when cells were healthy.

* * * * *